United States Patent [19]

Watson

[11] 4,155,174

[45] May 22, 1979

[54] DEVICE FOR MAKING PATTERNS OF IRREGULAR SHAPES

[76] Inventor: Alfred M. Watson, 505 Johnston Dr., Raymore, Mo. 64083

[21] Appl. No.: 901,466

[22] Filed: May 1, 1978

[51] Int. Cl.² ............................................. G01B 5/20
[52] U.S. Cl. ..................................................... 33/176
[58] Field of Search .......................... 33/176, 177, 175

[56] References Cited

U.S. PATENT DOCUMENTS

| 923,875 | 6/1909 | McDonald | 33/176 |
|---|---|---|---|
| 1,141,640 | 6/1915 | Huguenin | 33/176 |
| 1,579,702 | 4/1926 | Gottschalk | 33/176 |
| 2,101,478 | 12/1937 | Reich | 33/176 |
| 2,222,407 | 11/1940 | Gobel | 33/177 |
| 2,285,582 | 6/1942 | Human | 33/176 |
| 2,519,508 | 8/1950 | Schnorbus | 33/176 |

FOREIGN PATENT DOCUMENTS

| 996500 | 8/1951 | France | 33/177 |
|---|---|---|---|
| 1186910 | 2/1959 | France | 33/177 |

*Primary Examiner*—Harry N. Haroian
*Attorney, Agent, or Firm*—Schmidt, Johnson, Hovey & Williams

[57] ABSTRACT

An improved pattern marker for producing patterns of irregular surfaces or articles is provided which greatly facilitates pattern making in connection with such things as seat cushion covers, other upholstery items, or irregular wall configurations. The pattern maker preferably includes a central frame supporting a plurality of laterally shiftable, pivotal, outwardly extending, axially adjustable rods. Elongated web means (preferably in the form of a pair of separate webs each secured to the frame and having separate pickup reels) is slidably carried by the outermost ends of the rods and defines a substantially enclosed region. A marking instrument is also provided and includes a web-engaging roller, so that a tracing of the final web pattern can be produced. In use, the pattern maker is placed over a seat cushion or the like, and the respective rods are shifted laterally and pivotally within the frame, and longitudinally relative to the latter, so that the webs carried by the rods are correspondingly shifted to approximate the desired shape. The webs are then drawn up by the takeup reels in order to closely follow the outline of the cushion. The pattern maker is then placed on a sheet of pattern paper, and an outline of the web is traced onto the paper to complete the pattern.

4 Claims, 7 Drawing Figures

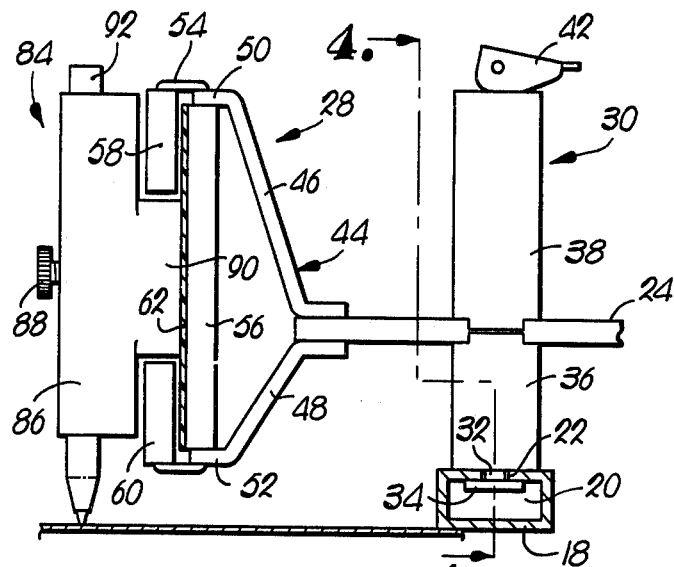
Fig.3.
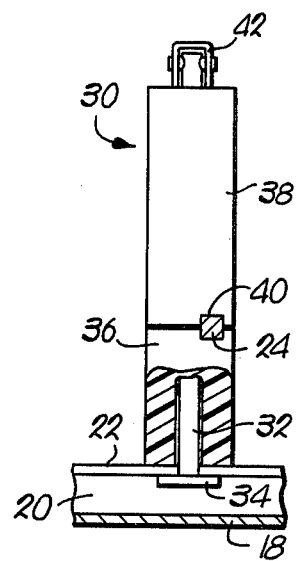
Fig.4.
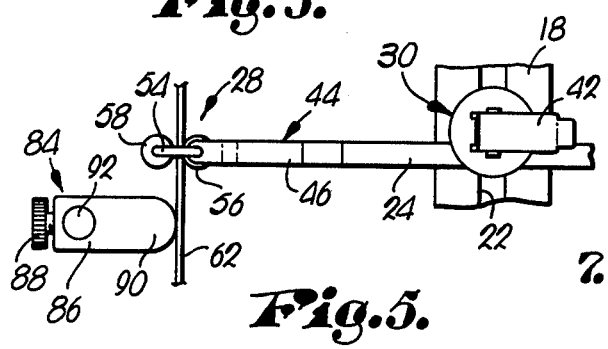
Fig.5.
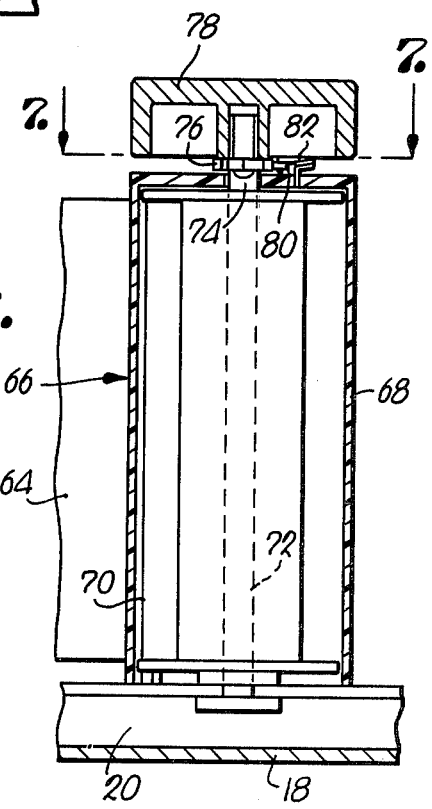
Fig.6.
Fig.7.
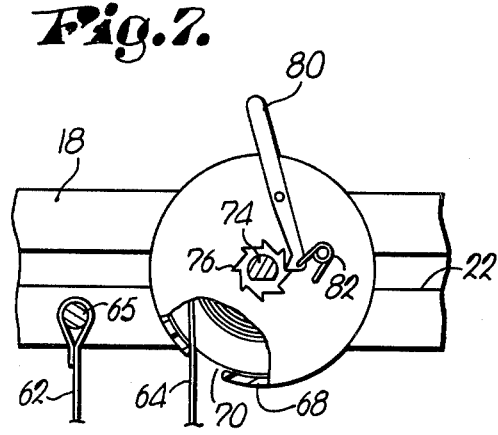

DEVICE FOR MAKING PATTERNS OF IRREGULAR SHAPES

BACKGROUND OF THE INVENTION

1. Field of the Invention

The present invention is broadly concerned with pattern making apparatus suited for use by upholsterers or other craftsmen in order to facilitate making of a pattern for seat cushions or other upholstery items. However, the invention is in no way limited to this particular end use, and variants of the preferred embodiment can be used for a wide variety of purposes, such as for producing a pattern of irregular wall configuration. More particularly, the invention is concerned with an improved pattern maker which includes a plurality of elongated rods which cooperatively and slidably carry elongated web means at the outer ends of the rods; the rods are in turn mounted for individual axial shifting thereof as needed to conform to a particular configuration, and in preferred forms the respective rods are laterally shiftable and rotatable to facilitate proper adjustment thereof.

2. Description of the Prior Art

The problem of pattern making with respect to irregular surfaces or objects has long presented problems for craftsmen. For example, upholsterers often need to make patterns of seat cushions and the like in order to prepare a replacement fabric for the cushion. The traditional cut and try method of pattern making in such instances is a costly and time consuming procedure, even for a skilled upholsterer. However, any pattern making apparatus designed to facilitate this operation must be of relatively small size, easy to use, and relatively inexpensive, or no real advantage is gained through the use thereof.

The problem of pattern making is also confronted in connection with irregular wall configurations such as archways or the like. Here again, the traditional approach has been to approximate the configuration and attempt to achieve a final result by additional refinements of the original approximation.

In view of the above, it will be readily apparent that a truly simple and efficient pattern maker adaptable for a wide variety of uses such as those outlined above would represent a real breakthrough in the art.

One type of pattern maker heretofore known is used by tile setters and comprises a plurality of shiftable pins mounted in an appropriate holder. When a pipe or other obstruction is encountered during a tiling job, an outline of the obstruction is taken by appropriate adjustment of the pins to conform to the outline, and the tile is thereafter cut accordingly. It will be seen though, that this type of pattern maker does not have universal applicability and cannot really be used in the instances discussed above.

SUMMARY OF THE INVENTION

The pattern maker of the invention broadly includes a plurality of elongated rods which cooperatively carry at the outer ends thereof web means in the form of an elongated strip or the like. Means are also provided for supporting the rods in order to allow axial shifting thereof as desired, and for releasably securing the rods at desired, axially extended positions.

In preferred forms, the device includes a central frame, with the rods extending outwardly from the frame and the web means defining a substantially enclosed region. Also, the rods are mounted to the frame for lateral movement thereof, axial shifting as desired, and pivoting of the rods about respective axes transverse to the longitudinal axes of the rods.

In use, the device is placed over an item such as a seat cushion to be patterned, and the rods are individually adjusted as necessary. This may involve lateral shifting, pivoting and axial movement of the rods in order to cause the peripheral web means carried by the rods to assume the shape of the article to be patterned. At this point all of the rods are locked in place, and the web means is taken up and adjusted in order to present a substantially rigidified structure. The device is then transferred, without changing its configuration, to a pattern table and a tracing is made around the web in order to provide the necesssary pattern. The tracing step is facilitated by provision of a specialized marking instrument which includes a roller adapted to engage the web; in this fashion, an appropriate mark can be made around the web simply by pressing the instrument against the web and against the paper, and shifting the instrument along the web.

BRIEF DESCRIPTION OF THE DRAWINGS

FIG. 3 is an enlarged fragmentary view in vertical section depicting a preferred frame structure, one of the rod assemblies provided around the frame structure, and the preferred marking instrument provided with the device;

FIG. 4 is a vertical sectional view taken along irregular line 4—4 of FIG. 3 which further illustrates the details of the rod assembly;

FIG. 5 is a fragmentary plan view further illustrating the apparatus depicted in FIGS. 3-4;

FIG. 6 is a vertical sectional view of the preferred takeup reel mechanism provided with each web of the overall device; and FIG. 7 is a sectional view taken along line 7—7 of FIG. 6 which further illustrates the details of construction of the takeup mechanism.

DESCRIPTION OF THE PREFERRED EMBODIMENT

Figure 1:
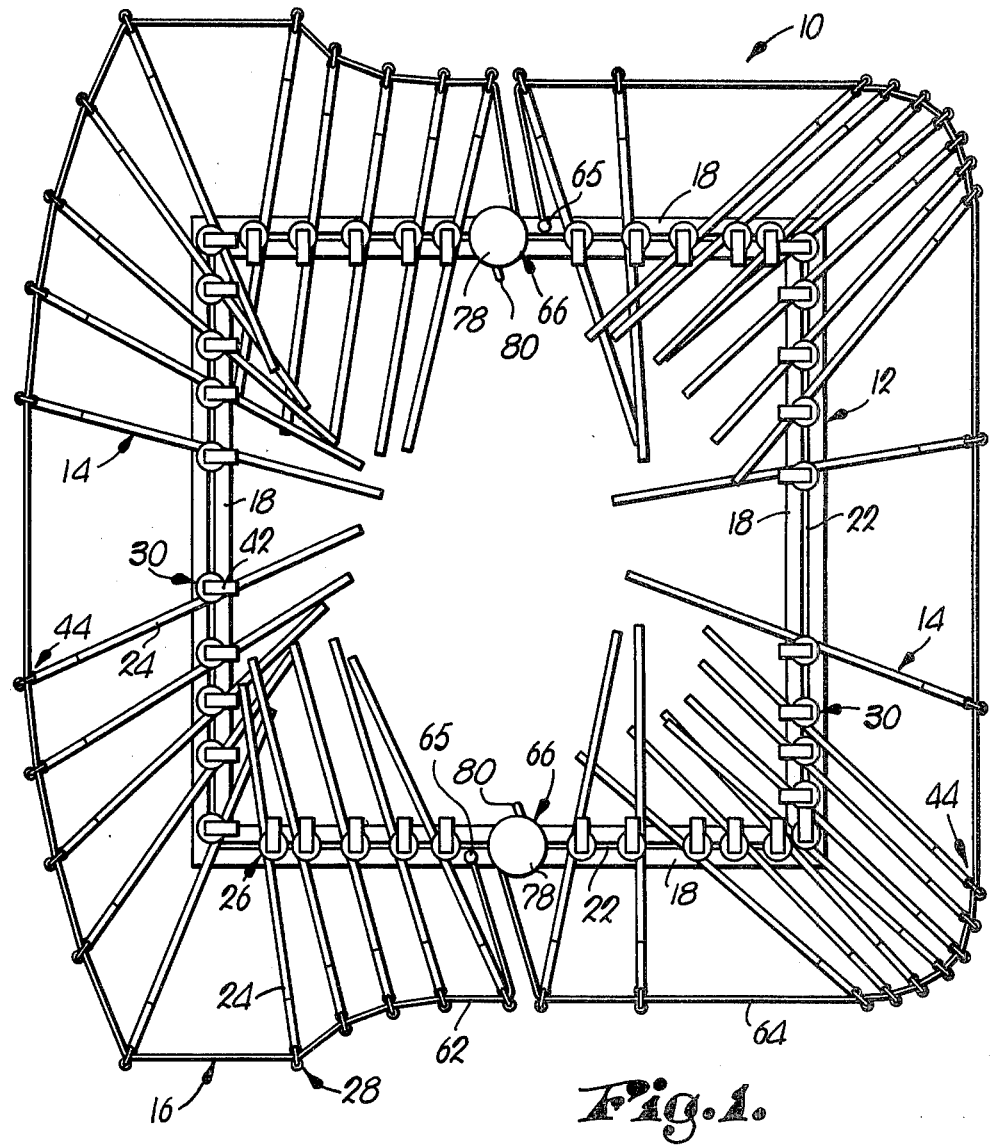
FIG. 1 is a plan view of a pattern making device in accordance with the invention, shown with the respective rods thereof extended and the webs drawn tightly to define an irregular region.

Referring now to the drawings, and particularly FIG. 1, the preferred pattern making device in accordance with the invention broadly includes a frame structure 12, a plurality of individual rod assemblies 14 mounted on the frame structure, and elongated web means 16 cooperatively carried by the assemblies 14.

Frame structure 12 is, in the illustrated embodiment, in the form of a square member defined by respective, interconnected frame elements 18. Each element 18 is of generally tubular construction, is rectangular in cross sectional configuration, and has a central passageway 20 therethrough. The upper wall of each element 18 is provided with an elongated slot-like opening 22 which is in axial alignment with the element and extends the entire length of the latter. As best seen in FIG. 1, the respective elements 18 are interconnected to form the square frame structure, and the openings 22 provided with each element 18 are in communication so as to provide a continuous, uninterrupted track extending around the entirety of the frame structure.

Figure 2:
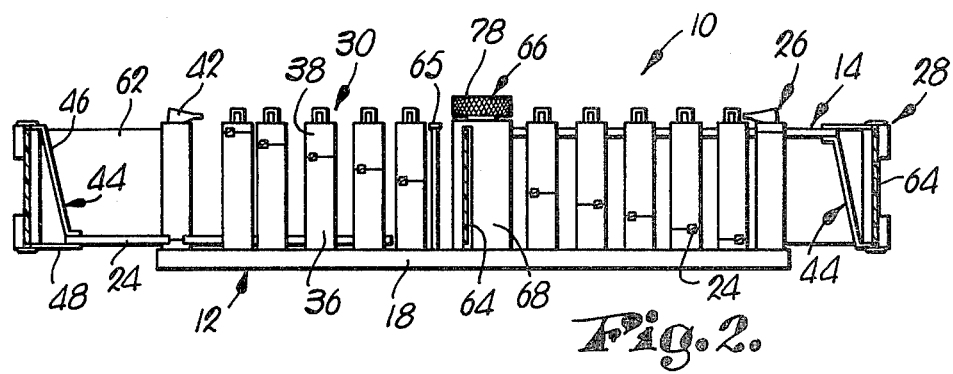
FIG. 2 is a vertical sectional view of the device illustrated in FIG. 1.

Each rod assembly 14 includes an elongated, unitary rod 24, means 26 for supporting the rods for axial shifting thereof and releasably securing the rods at desired, axially extended positions, and web mounting means 28 at the outermost end of the rod 24. Means 26 includes (see FIGS. 3–5) an elongated, upright, cylindrical mount 30. Mount 30 includes an elongated, upright central shaft 32 having a circular, disc-like retainer 34 at the lower end thereof. A lower annular mounting block 36 is mounted on the shaft 32, along with an upper mounting block 38. As best seen in FIG. 4, the respective mounting blocks 36 and 38 are in engagement, and are cooperatively configured to provide an off-center aperture 40 therethrough which extends generally transversely relative to the longitudinal axis of shaft 32 and is adapted to receive rod 24. The shaft 32 extends above the superposed blocks 36, 38, and has a conventional, rotatable cam-type locking element 42 secured thereto which is in engagement with the upper surface of the block 38. As best seen in FIG. 3, the retainer 34 is of a diameter greater than the width of the opening 22, so that the mount 30 can be shifted along the length of the element 18, but cannot be removed therefrom. Also, (FIG. 2), it will be seen that although the heights of the individual mounts 30 are the same, the vertical lengths of the superposed blocks 36, 38 are different for adjacent mounts 30. In this fashion the rod-gripping apparatuses presented by the blocks 36, 38, and the corresponding apertures 40, are at different vertical levels for adjacent mounts 30. This eliminates the possibility of interference between the rods during the use of device 10, as will be explained.

Each web mounting means 28 includes a yoke 44 mounted on the outermost end of the rod 24 having a pair of yoke arms 46, 48. The yoke arms include outermost, laterally extending, vertically apertured ends 50, 52. Also, the relative lengths and angularities of the yoke arms on different rods will be different by virtue of the "staircase" orientation of the rods themselves, and the need to support the webs at substantially the same vertical level throughout the lengths thereof. An elongated, somewhat C-shaped, roller-supporting wire 54 is also provided with each yoke 44 which extends between and through the ends 50, 52 as illustrated. An elongated roller 56 is rotatably supported by the wire 54 and the yoke arms ends 50, 52. Also, somewhat shorter rollers 58 and 60 are supported by the opposed ends of the wire 54. The rollers 58, 60 are slightly spaced from the roller 56, and are vertically spaced from each other.

Web means 16 is preferably in the form of a pair of separate, elongated, strip-like webs 62 and 64 which are cooperatively carried by the respective rods 24 through the mounting means 28 provided with each of the latter. In this regard, it will be seen that each web 62, 64 is supported by respective numbers of the rods 24, and that the two webs cooperatively define a substantially enclosed region about frame structure 12. Each of the webs is shiftably carried between the roller 56, and the spaced rollers 58, 60 provided with each yoke assembly. Also (see FIG. 1), one end of each web is fixedly secured to an element 18 by means of a mounting post 65, while the opposite end of the web is secured to a stationary takeup reel mechanism 66.

Mechanism 66 includes an upright, hollow housing 68 fixedly secured to the appropriate element 18 and having a vertically extending, web-receiving opening 70 therethrough. An elongated, upright, axially rotatable reel shaft 72 is disposed within housing 68 and has an uppermost extension 74 protruding from the housing. A ratchet wheel 76 is mounted on the protrusion 74, along with a knurled operating handle 78. A pawl 80 is pivotally mounted on the upper end of housing 68 adjacent ratchet 76, and has an over-center coil biasing spring 82 secured thereto.

As will be readily apparent from the foregoing description, the reel mechanism 66 can be used to take up any slack in the corresponding web, simply by shifting the pawl 80 out of engagement with the ratchet 76, and turning the handle 78 until the web is taken up. At this point the pawl can be repositioned adjacent the ratchet 76 for preventing unintended unwinding or slippage of the associated web. Of course, the spring 82 serves to bias the pawl 80 into an operative engagement with the ratchet.

In the use of device 10 it is only necessary to place frame structure 12 over an object to be patterned, whereupon the rods 24 can be positioned as necessary. In each case this would involve upturning of the associated cam lock 42 in the well known manner to free the mount 30. The mount 30 can then be shifted along the frame element 18, the rod 24 can be extended or retracted relative to the mount the blocks 36, 38 can be axially rotated so as to correspondingly rotate the rod 24 about a vertical axis transverse to the longitudinal axis thereof. When a particular rod assembly has been positioned as desired, it is only necessary to turn cam lock 42 to its locking position illustrated in FIG. 3. This serves to fractionally bind together the blocks 36, 38 to prevent both rotation and translatory shifting of the mount 30, while at the same time precluding further axial shifting of the rod 24. It will also be understood that by virtue of the vertical "staircase" arrangement of the adjacent rods, the possibility of interference between the ends of the rods within frame structure 12 is minimized. Also, the length of the rods 24 is correlated with the frame structure 12 so that rods can be withdrawn into the frame structure as necessary.

When all of the rods have been positioned in order to approximate the object being patterned (it being understood that the webs 62, 64 will be loosely carried by the rods during this operation), it is only necessary to take up the respective webs through the use of the mechanisms 66 as explained above. Once the webs 62, 64 are relatively taut, final adjustment of the rods can be made to precisely conform to the outline of the object being patterned.

The final step involves placing the device onto a sheet of pattern paper or the like followed by tracing of the outline of the web. In the latter regard, a particularly preferred marking instrument 84 can be used which includes an elongated, vertically bored main body 86 having a set screw 88 therethrough and a web-engaging roller unit 90 substantially centrally located on the body 86 and extending laterally therefrom. A marking pen 92 is inserted within main body 86, and is secured in place by means of set screw 88. The unit 90 of instrument 84 is then placed in engagement with the web and a tracing is made. As best shown in FIG. 3, the roller unit 90 is configured to pass between the spaced rollers 58 and 60 in order to facilitate the tracing operation. The size of the roller unit 90 also ensures that pattern being traced will be slightly larger than the precise area circumscribed by the webs, so that a certain amount of necessary overlap is provided in the pattern.

It should also be understood that a number of variations can be made in the preferred device herein described without departing from the spirit and scope of the invention. For example, the rods 24 could be formed of telescopically interfitted sections which would be axially adjustable in the same functional manner as the rods described above. Also, the supporting frame for the rods need not in all case be totally circumscribed by the web means. For example, when a device in accordance with the invention is used for tracing an irregular wall configuration, it may not be necessary to provide a completely circumscribing web means. Finally, although a pair of webs has been particularly described a single web, or for that matter more than two, could be used as the occasion arises.

I claim:

1. A device for making a pattern of an object comprising:

frame structure;

a plurality of elongated rods each being individually mounted on the frame structure;

a plurality of mounts pivotally secured to said frame and each supporting a respective rod, said mounts each including releasable rod gripping apparatus, the rod gripping apparatus of adjacent mounts being at different levels vertically whereby to position each of said adjacent rods in a different horizontal plane;

elongated, flexible web means adjacent the outer ends of said rods;

means mounting the web means on the outer ends of said rods, said mounting means including a first roller proximal to the outer end of the rod, rotatably carried thereby and engaging the face of the web means proximal to said outer end of the rod and a pair of rollers spaced outwardly from said first roller, rotatably carried by the outer end of the rod and engaging the face of the web means distal from said outer end of the rod; and reel means carried by said frame for winding and unwinding the web as desired.

2. The device as set forth in claim 1, said web means having a width substantially the same as the length of said first roller.

3. The device as set forth in claim 2, said web means being of a material sufficiently flexible to be taken up on said reel.

4. The device as set forth in claim 3, said pair of rollers being vertically spaced from each other to permit the web means to define a track therebetween and a marking instrument engageable with said track for following the path thereof.

* * * * *